United States Patent [19]
Rich et al.

[11] 3,786,644
[45] Jan. 22, 1974

[54] SYSTEM FOR CHANGING THE STATIC ELECTRICAL CHARGE ON $CO_2$ ICE PARTICLES

[75] Inventors: Harold T. Rich, Fullerton; Torrence L. Wolf, Santa Ana, both of Calif.

[73] Assignee: Airco, Inc., Montvale, N.J.

[22] Filed: June 2, 1972

[21] Appl. No.: 259,227

[52] U.S. Cl. .................................. 62/10, 62/35
[51] Int. Cl. ............................................. F25j 1/00
[58] Field of Search.. 62/10, 35, 12, 8; 204/157.1 S; 239/25, 14

[56] References Cited
UNITED STATES PATENTS

| | | | |
|---|---|---|---|
| 3,398,077 | 8/1968 | Crownover | 62/12 |
| 3,349,020 | 10/1967 | Crownover | 62/12 |
| 3,389,971 | 6/1968 | Alliger | 204/157.1 S |
| 3,443,389 | 5/1969 | Townsend | 62/35 |
| 3,492,829 | 2/1970 | Stanford | 62/35 |

Primary Examiner—Norman Yudkoff
Assistant Examiner—Arthur F. Purcell
Attorney, Agent, or Firm—Roger M. Rathbun et al.

[57] ABSTRACT

A $CO_2$ snow making machine comprising a snow horn into which liquid $CO_2$ is expanded for producing $CO_2$ snow, and an electrically energized conductor of general hoop shape spaced from and encircling the horn outlet.

4 Claims, 1 Drawing Figure

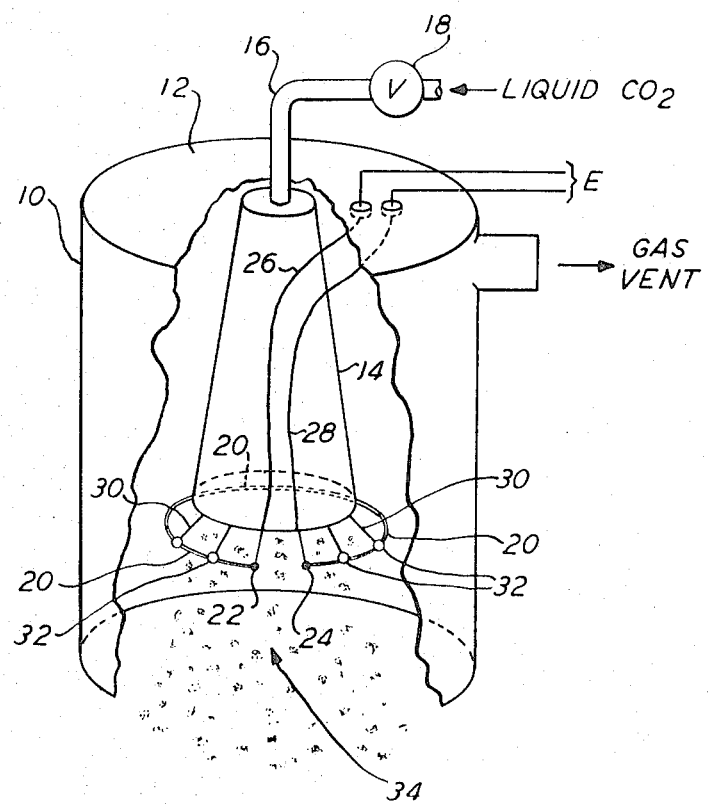

SYSTEM FOR CHANGING THE STATIC ELECTRICAL CHARGE ON $CO_2$ ICE PARTICLES

BACKGROUND OF INVENTION

The expansion of liquid $CO_2$ into a so-called snow horn for producing $CO_2$ snow is well-known practice, a typical example being U.S. Pat. No. 3,492,829 to Stanford, assigned to the same assignee of the present invention. In this apparatus, the snow formed in the horn is intended to fall by gravity into the hopper, etc. of an ice-making machine for example. However, in practice it is found that considerable snow sticks to the inner wall of the horn, which upon continued operation tends to reduce the output thereof. Various methods for freeing the horn of sticking snown have been proposed, such as mechanical vibration of the horn, heat transfer coils surrounding the outer wall of the horn, etc.; however, these devices have for the most part been unsatisfactory in practice.

The present invention concerns an improved method of preventing initial sticking of $CO_2$ snow to a snow horn or the like.

SUMMARY OF THE INVENTION

In accordance with the invention, a snow horn of the character described above is provided with an electrical conductor generally in open-hoop form that is mounted at and encircles the discharge end of the horn so that snow from the horn can fall freely therethrough. The conductor is electrically energized so as to generate light radiation, such as from the infrared to the ultra-violet sections of the spectrum. The $CO_2$ ice particles accordingly are subjected to the surrounding source of radiation for changing or cancelling the electrostatic particle charge that otherwise tends to cause attraction and sticking of the individual particles to and on the inner wall of the snow horn.

A principal object of the invention, therefore, is to provide an improved $CO_2$ snow-making system of the character described above, wherein charged snow particles are exposed to radiant light energy for preventing sticking thereof to surfaces of the snow-making equipment.

BRIEF DESCRIPTION OF THE DRAWING

The single FIGURE of the drawing is an elevational view, partly broken away, schematically illustrating one form of the invention as applied to a $CO_2$ snow horn.

DESCRIPTION OF PREFERRED EMBODIMENT

The snow-making machine comprises a cylindrical snow chamber 10 that is open at its lower end as shown, and has a cover 12 at its upper end in which is suitably mounted a snow horn 14. The converging or entrance end of the snow horn is connected to a liquid $CO_2$ supply line 16 having a flow control valve 18. The liquid $CO_2$ flows into an expansion nozzle (not shown) at the entrance of the snow horn for producing $CO_2$ snow in the usual manner.

As the velocity of the $CO_2$ ice particles decreases in the lower expanding part of the horn, the particles which have a negative charge are attracted toward the enclosing horn wall. Some of the particles tend to stick thereon, thereby effectively decreasing the horn discharge area. For precluding such sticking, a conductor 20 is mounted at the exhaust end of the horn so as to encircle and extend somewhat beyond the horn periphery. The conductor is in the form of an open hoop, the terminals of which 22 and 24 are connected by electrical conductors 26 and 28 as shown, to a suitable source of electrical power E for energizing the conductor. The conductor which depends beneath the exhaust end of the horn is connected to supports or struts 30 that extend generally downwardly and radially from the periphery of the horn. Suitable insulators 32 on which the conductor is suspended, electrically isolate the conductor from the snow horn.

In one application of the invention, the conductor 20 consists of a wire alloy known to the trade as "Kanthal A-1." This wire, which comprises an alloy of Al, Cr, Co and Fe, has high resistivity, and temperature tolerance up to approximately 2,400° F. In practice, typical power supplied to the conductor is 20 volts a.c. at 40 amperes for a nominal 800 watt of power input. At that input the conductor operates at between 1,500° F and 2000° F, giving off light of about 5,800–6,600 Angstroms.

The operation of the device in changing or altering the electrostatic charge on the individual snow particle, is believed to be due to exposure of the snow particles to radiant light energy from the energized conductor 20. This exposure apparently produces emission or ejection of electrons from the snow upon absorption of sufficient high frequency light energy. As the snow particles are found in general to have a negative charge, this ejection of electrons therefrom tends to reduce or even remove the negative charge, depending on the amount of light energy absorbed.

A demonstration of the invention applied to a typical $CO_2$ snow horn apparatus as disclosed herein, showed the usual amount of snow sticking to the inner wall of the horn when the conductor 20 was de-energized; however, upon energization of the conductor as described above, the snow particles fell freely through the horn without sticking thereto. It was also noted that the snow did not tend to "ball" or form in clumps in the apparatus as in common practice.

In a practical embodiment, the conductor 20 is about 0.062 inch in diameter, forming a 7-inch circle immediately underneath the snow horn. The exhaust end of the snow horn is somewhat smaller as indicated in the drawing so that the falling snow particles at 34, although exposed at close range to the radiation therefrom do not contact the incandescent conductor.

The power requirements for the Kanthal A-1 conductor described above, are between 700 and 1200 watts depending on the size and production rate of the $CO_2$ snow horn device. As indicated above, the shorter and visible band in the electro-magnetic frequency spectrum is preferred, as it utilizes the photoelectric effect of light in order to reduce or cancel the negative charge on the $CO_2$ particle. When energized to absorb about 800 watts, for example, the conductor becomes incandescent to cause discharge for practical purposes of the negative charge on the $CO_2$ particles.

Having set forth the invention in what is considered to be the best embodiment thereof, it will be understood that changes may be made in the system and apparatus as above set forth without departing from the spirit of the invention or exceeding the scope thereof as defined in the following claims. For example, location of the radiating conductor can be varied as regards the longitudinal axis of the horn or equivalent snow device, and the conductor itself can be shaped as desired for most effectively directing visible radiation into the stream of the $CO_2$ particles.

We claim:

1. In a $CO_2$ snow-making machine wherein $CO_2$ liquid is expanded within a snow chamber at the upper end thereof to produce free-falling $CO_2$ snow, the method of preventing sticking of snow to adjacent walls of the chamber which comprises generating radiation in the visible band of the electromagnetic frequency spectrum, and directing the radiation at close range into the stream of falling snow particles.

2. The method as specified in claim 1 wherein the radiation is directed from the exterior of the particle stream radially into the stream and has a light intensity of from about 5800–6600 Angstroms.

3. In apparatus for making $CO_2$ snow having means for expanding liquid $CO_2$ into the upper part of a snow horn for free-fall therethrough of the resulting $CO_2$ snow, means for preventing sticking of snow particles to the inner wall of the snow horn comprising:
 a Electrical conducting means positioned adjacent to the exhaust end of the snow horn and generally surrounding the stream of $CO_2$ snow therefrom, and
 b A source of potential for energizing said conducting means to incandescence.

4. Apparatus as specified in claim 3, wherein the electrical conducting means is a conductor of open-hoop form generally positioned near the exhaust end of the snow horn and concentrically thereof.

* * * * *